US008563450B2

(12) United States Patent
Hofmann et al.

(10) Patent No.: US 8,563,450 B2
(45) Date of Patent: *Oct. 22, 2013

(54) COMPOSITION FOR HIGH PERFORMANCE GLASS HIGH PERFORMANCE GLASS FIBERS AND ARTICLES THEREFROM

(75) Inventors: Douglas A. Hofmann, Hebron, OH (US); Peter B. McGinnis, Gahanna, OH (US)

(73) Assignee: OCV Intellectual Capital, LLC, Toledo, OH (US)

( * ) Notice: Subject to any disclaimer, the term of this patent is extended or adjusted under 35 U.S.C. 154(b) by 204 days.

This patent is subject to a terminal disclaimer.

(21) Appl. No.: 12/847,206

(22) Filed: Sep. 16, 2010

(65) Prior Publication Data

US 2011/0003678 A1 Jan. 6, 2011

Related U.S. Application Data

(63) Continuation of application No. 11/267,739, filed on Nov. 4, 2005, now Pat. No. 7,799,713.

(51) Int. Cl.
*C03C 13/00* (2006.01)
*C03C 6/02* (2006.01)

(52) U.S. Cl.
USPC ........... 501/35; 501/36; 501/69; 501/70; 501/27; 416/230; 416/223

(58) Field of Classification Search
USPC ........... 501/35, 36, 69, 70; 416/223, 230
See application file for complete search history.

(56) References Cited

U.S. PATENT DOCUMENTS

| | | | |
|---|---|---|---|
| 3,044,888 A | 7/1962 | Provance et al. | |
| 3,189,471 A * | 6/1965 | Thomas | 501/35 |
| 3,220,915 A | 11/1965 | Shannon | |
| 3,360,386 A | 12/1967 | Kelley et al. | |
| 3,402,055 A | 9/1968 | Harris et al. | |
| 3,408,213 A | 10/1968 | Provance et al. | |
| 3,484,259 A | 12/1969 | Kelly et al. | |
| 3,498,805 A | 3/1970 | Stalego | |
| 3,524,738 A | 8/1970 | Grubb et al. | |
| 3,535,096 A | 10/1970 | Bour et al. | |
| 3,709,705 A | 1/1973 | Hagedorn | |
| 3,804,646 A | 4/1974 | Dumbaugh et al. | |
| 3,833,388 A | 9/1974 | Ohlberg | |
| 3,861,926 A | 1/1975 | Irlam et al. | |
| 3,876,481 A * | 4/1975 | Erickson et al. | 501/38 |
| 3,887,386 A | 6/1975 | Majumdar | |
| 3,892,581 A | 7/1975 | Burgman et al. | |
| 3,902,881 A | 9/1975 | Pirooz | |
| 3,904,423 A | 9/1975 | Guthrie | |
| 3,945,838 A | 3/1976 | Erickson et al. | |
| 4,002,482 A * | 1/1977 | Coenen | 501/33 |
| 4,012,131 A | 3/1977 | Krohn | |
| 4,046,948 A | 9/1977 | Zlochower | |
| 4,063,001 A | 12/1977 | Zlochower | |
| 4,090,882 A | 5/1978 | Rauschenfels | |
| 4,199,364 A * | 4/1980 | Neely | 501/35 |
| 4,325,724 A | 4/1982 | Froberg | |
| 4,366,251 A | 12/1982 | Rapp | |
| 4,375,527 A | 3/1983 | Zahner | |
| 4,386,164 A | 5/1983 | Moser | |
| 4,491,951 A | 1/1985 | Dunn | |
| 4,569,471 A | 2/1986 | Ingemansson | |
| 4,582,748 A * | 4/1986 | Eastes et al. | 428/297.4 |
| 4,764,487 A | 8/1988 | Lewis | |
| 4,824,806 A * | 4/1989 | Yokoi et al. | 501/35 |
| 4,857,485 A | 8/1989 | Brennan et al. | |
| 4,882,302 A * | 11/1989 | Horiuchi et al. | 501/27 |
| 4,892,846 A | 1/1990 | Rogers et al. | |
| 4,935,291 A | 6/1990 | Gunnink | |
| 4,976,587 A * | 12/1990 | Johnston et al. | 416/230 |
| 5,212,121 A | 5/1993 | Omata | |
| 5,248,637 A | 9/1993 | Taneda et al. | |
| 5,302,444 A | 4/1994 | Jackson et al. | |
| 5,332,699 A | 7/1994 | Olds et al. | |
| 5,474,425 A | 12/1995 | Lawlor | |
| 5,569,629 A | 10/1996 | TenEyck et al. | |
| 5,576,252 A | 11/1996 | Rapp et al. | |

(Continued)

FOREIGN PATENT DOCUMENTS

| | | |
|---|---|---|
| CA | 2528923 | 12/2004 |
| CN | 1113893 | 12/1995 |

(Continued)

OTHER PUBLICATIONS

Thomson Scientific, London, GB; AN 1983-50368K Database WPI Week 1983321.
US Office Action for U.S. Appl. No. 11/267,739 dated Dec. 18, 2008.
US Office Action for U.S. Appl. No. 11/267,739 dated Dec. 3, 2009.
US Office Action for U.S. Appl. No. 11/267,702 dated Dec. 3, 2009.
US Office Action for U.S. Appl. No. 11/267,702 dated Dec. 23, 2008.
PCT Notification of Transmittal of the International Search Report and the Written Opinion of the International Searching Authority for PCT Application PCT/US06/42437 dated Apr. 30, 2007.
PCT Notification Concerning Transmittal of International Preliminary Report on Patentability, PCT Application PCT/US06/042406 dated May 15, 2008.

(Continued)

*Primary Examiner* — Karl Group
*Assistant Examiner* — Elizabeth A Bolden
(74) *Attorney, Agent, or Firm* — Calfee, Halter & Griswold LLP

(57) ABSTRACT

Glass batch compositions for the formation of high-modulus, and high-strength glass fibers as well as fibers suitable for use as textile and reinforcements are disclosed. Fibers formed of the composition are especially suitable for use in high-strength, low-weight applications such as windmill blades and high strength and modulus applications where strength and stiffness are required in the composite. The glass composition is up to about 70.5 weight % $SiO_2$, about 24.5 weight % $Al_2O_3$, about 22 weight % alkaline earth oxides and may include small amounts of alkali metal oxides and $ZrO_2$. Fiberglass-reinforced composite articles such as windmill blades are also disclosed.

23 Claims, No Drawings

(56) References Cited

U.S. PATENT DOCUMENTS

| | | | |
|---|---|---|---|
| 5,585,312 A | 12/1996 | TenEyck et al. | |
| 5,691,255 A * | 11/1997 | Jensen et al. | 501/36 |
| 5,719,092 A * | 2/1998 | Arrington | 442/189 |
| 5,789,329 A | 8/1998 | Eastes et al. | |
| 5,819,614 A | 10/1998 | Jander | |
| 5,843,853 A | 12/1998 | Heitmann | |
| 5,851,932 A | 12/1998 | Dickson et al. | |
| 5,935,886 A | 8/1999 | Jensen et al. | |
| 5,948,535 A | 9/1999 | Chiurio et al. | |
| 5,962,354 A * | 10/1999 | Fyles et al. | 501/36 |
| 5,997,977 A | 12/1999 | Zou et al. | |
| 6,063,470 A | 5/2000 | Zou et al. | |
| 6,069,100 A | 5/2000 | Naumann et al. | |
| 6,089,021 A | 7/2000 | Senandayake | |
| 6,101,847 A | 8/2000 | Shamp | |
| 6,136,735 A | 10/2000 | Gallo et al. | |
| 6,156,683 A | 12/2000 | Grove-Rasmussen et al. | |
| 6,169,047 B1 | 1/2001 | Nishizawa et al. | |
| 6,214,429 B1 | 4/2001 | Zou et al. | |
| 6,237,369 B1 | 5/2001 | LeBlanc et al. | |
| 6,248,678 B1 | 6/2001 | Pinckney | |
| 6,300,264 B1 | 10/2001 | Ohara | |
| 6,306,786 B1 | 10/2001 | Koyama et al. | |
| 6,314,760 B1 | 11/2001 | Chenoweth | |
| 6,329,310 B1 | 12/2001 | Peuchert et al. | |
| 6,358,873 B1 | 3/2002 | Stewart | |
| 6,376,403 B1 | 4/2002 | Koyama et al. | |
| 6,399,527 B1 | 6/2002 | Kishimoto et al. | |
| 6,403,676 B1 * | 6/2002 | Jia et al. | 523/116 |
| 6,422,041 B1 | 7/2002 | Simpson et al. | |
| 6,451,720 B1 | 9/2002 | Kishimoto | |
| 6,457,943 B1 | 10/2002 | Olsen et al. | |
| 6,458,436 B1 | 10/2002 | Hansen et al. | |
| 6,496,706 B1 | 12/2002 | Jon et al. | |
| 6,540,508 B1 | 4/2003 | Simpson et al. | |
| 6,579,599 B1 | 6/2003 | Blum et al. | |
| 6,686,304 B1 * | 2/2004 | Wallenberger | 501/35 |
| 6,794,322 B2 | 9/2004 | Sircar | |
| 6,809,050 B1 * | 10/2004 | McGinnis | 501/35 |
| 6,818,575 B2 | 11/2004 | Wallenberger | |
| 6,867,158 B2 | 3/2005 | Peuchert | |
| 6,933,045 B2 | 8/2005 | Tamura | |
| 6,933,252 B2 | 8/2005 | Pierce | |
| 6,998,361 B2 | 2/2006 | Lewis | |
| 7,022,634 B2 | 4/2006 | Hamilton et al. | |
| 7,189,671 B1 * | 3/2007 | Lewis | 501/36 |
| 7,259,118 B2 | 8/2007 | Jubb et al. | |
| 7,285,510 B2 | 10/2007 | Sakaguchi et al. | |
| 7,449,419 B2 | 11/2008 | Li | |
| 7,509,819 B2 | 3/2009 | Baker et al. | |
| 7,781,355 B2 * | 8/2010 | Berthereau et al. | 501/71 |
| 7,799,713 B2 * | 9/2010 | Hofmann et al. | 501/36 |
| 7,811,954 B2 * | 10/2010 | Berthereau et al. | 501/36 |
| 7,823,417 B2 | 11/2010 | Hofmann et al. | |
| 2001/0011058 A1 | 8/2001 | Tamura | |
| 2002/0000101 A1 | 1/2002 | Chenoweth | |
| 2002/0045528 A1 | 4/2002 | Kusuno et al. | |
| 2003/0018855 A1 | 1/2003 | McWilliams et al. | |
| 2003/0077178 A1 | 4/2003 | Stearns | |
| 2003/0100431 A1 | 5/2003 | Koyo et al. | |
| 2003/0166446 A1 * | 9/2003 | Lewis | 501/27 |
| 2003/0188554 A1 | 10/2003 | Baker et al. | |
| 2003/0207748 A1 | 11/2003 | Wallenberger | |
| 2003/0224922 A1 * | 12/2003 | Wallenberger | 501/35 |
| 2004/0092379 A1 * | 5/2004 | Lewis | 501/70 |
| 2004/0220038 A1 | 11/2004 | Wolff | |
| 2005/0009683 A1 * | 1/2005 | Hamilton et al. | 501/35 |
| 2005/0014624 A1 | 1/2005 | Jubb et al. | |
| 2005/0031703 A1 | 2/2005 | Beier et al. | |
| 2005/0084440 A1 | 4/2005 | Chacon et al. | |
| 2005/0085369 A1 | 4/2005 | Jensen | |
| 2005/0090377 A1 | 4/2005 | Shelestak et al. | |
| 2005/0107238 A1 * | 5/2005 | Li | 501/35 |
| 2005/0130825 A1 | 6/2005 | Kravchenko et al. | |
| 2005/0232828 A1 | 10/2005 | Merry | |
| 2005/0234216 A1 | 10/2005 | Klein et al. | |
| 2006/0001005 A1 | 1/2006 | Kishimoto et al. | |
| 2006/0003884 A1 | 1/2006 | Nishizawa et al. | |
| 2006/0257240 A1 | 11/2006 | Naskali et al. | |
| 2007/0087139 A1 * | 4/2007 | Creux et al. | 428/32.71 |
| 2007/0105701 A1 | 5/2007 | Hofmann et al. | |
| 2007/0107220 A1 | 5/2007 | Bakhuis et al. | |
| 2008/0009403 A1 | 1/2008 | Hofmann et al. | |
| 2008/0053152 A1 | 3/2008 | Kurachi et al. | |
| 2008/0141721 A1 | 6/2008 | Adams et al. | |
| 2009/0286440 A1 | 11/2009 | Lecomte et al. | |
| 2010/0069220 A1 * | 3/2010 | McGinnis et al. | 501/32 |
| 2010/0093511 A1 | 4/2010 | GBertheureau et al. | |
| 2010/0160139 A1 * | 6/2010 | McGinnis | 501/38 |
| 2010/0160140 A1 * | 6/2010 | McGinnis | 501/38 |
| 2010/0162772 A1 | 7/2010 | McGinnis | |
| 2010/0184345 A1 | 7/2010 | Lalande et al. | |
| 2011/0000263 A1 | 1/2011 | Hofmann | |
| 2011/0003678 A1 | 1/2011 | Hofmann et al. | |
| 2011/0039681 A1 | 2/2011 | Lecomte et al. | |

FOREIGN PATENT DOCUMENTS

| | | |
|---|---|---|
| CN | 1243501 | 2/2000 |
| CN | 1392870 | 1/2003 |
| CN | 1678654 | 10/2005 |
| CN | 101580344 | 11/2009 |
| CN | 101597140 | 12/2009 |
| CN | 101691278 | 4/2010 |
| CN | 101838110 | 9/2010 |
| CN | 101549958 | 1/2011 |
| DE | 1496520 | 8/1969 |
| EP | 500325 A1 * | 8/1992 |
| EP | 931774 A1 * | 7/1999 |
| FR | 1357393 | 4/1964 |
| FR | 1435073 | 4/1966 |
| FR | 1534135 A * | 7/1968 |
| FR | 1589410 | 3/1970 |
| FR | 2223328 | 10/1974 |
| FR | 2692248 | 12/1993 |
| FR | 2856055 A1 * | 12/2004 |
| FR | 2879591 | 6/2006 |
| FR | 2916438 | 11/2008 |
| GB | 428720 | 5/1935 |
| GB | 1006524 | 10/1965 |
| GB | 1147718 | 4/1969 |
| GB | 1147718 A * | 4/1969 |
| GB | 1209244 | 10/1970 |
| GB | 1531287 A * | 11/1978 |
| JP | 45-011228 | 5/1970 |
| JP | 51055308 A * | 5/1976 |
| JP | 58064243 | 4/1983 |
| JP | 58064243 A * | 4/1983 |
| JP | 58-088138 | 5/1983 |
| JP | 1-189985 | 7/1989 |
| JP | 1-239039 | 9/1989 |
| JP | 03112650 A * | 5/1991 |
| JP | 04050144 A * | 2/1992 |
| JP | 06211543 A * | 8/1994 |
| JP | 06219780 A * | 8/1994 |
| JP | 06305773 A * | 11/1994 |
| JP | 07010598 A * | 1/1995 |
| JP | 08231240 A * | 9/1996 |
| JP | 2582361 | 2/1997 |
| JP | 11-21147 | 1/1999 |
| JP | 11-021147 | 1/1999 |
| JP | 2000247677 A * | 9/2000 |
| JP | 2000247683 A * | 9/2000 |
| JP | 2001-206733 | 7/2001 |
| JP | 2001-316961 | 11/2001 |
| JP | 2002-003237 | 1/2002 |
| JP | 2002-060252 | 2/2002 |
| JP | 2002-069941 | 3/2002 |
| JP | 2002-081022 | 3/2002 |
| JP | 2002-154843 | 5/2002 |
| JP | 2002-293574 | 10/2002 |
| JP | 2003-137590 | 5/2003 |
| JP | 2003-160350 | 6/2003 |
| JP | 2003171143 A * | 6/2003 |

(56) References Cited

FOREIGN PATENT DOCUMENTS

| | | |
|---|---|---|
| JP | 2003-183031 | 7/2003 |
| JP | 2003-239847 | 8/2003 |
| JP | 2003-321247 | 11/2003 |
| JP | 2004-091307 | 3/2004 |
| WO | 99/31021 | 6/1999 |
| WO | 00/15526 | 3/2000 |
| WO | 02/20419 | 3/2002 |
| WO | 02/42233 | 5/2002 |
| WO | 2004/020506 | 3/2004 |
| WO | 2004094794 | 11/2004 |
| WO | WO 2005092808 A1 * | 10/2005 |
| WO | WO 2005093227 A2 * | 10/2005 |
| WO | 2006/064164 | 6/2006 |
| WO | 2007055964 | 5/2007 |
| WO | 2007055968 | 5/2007 |
| WO | 2008/073585 | 6/2008 |
| WO | 2010/075258 | 7/2010 |
| WO | 2010/075262 | 7/2010 |
| WO | 2010/075267 | 7/2010 |

OTHER PUBLICATIONS

PCT Notification of Transmittal of the International Search Report and the Written Opinion of the International Search Authority for PCT Application PCT/US06/42406 dated May 8, 2007.
European Search Report for PCT/US06/42437 dated Apr. 30, 2007.
Office action from Chinese Application No. 200680041114.4 dated Oct. 24, 2012.
Office action from European Application No. 09/796559.4 dated Dec. 19, 2012.
Office action from Indian Application No. 1733/KOLNP/2008 dated Dec. 6, 2012.
Office action and Search Report from Taiwanese Application No. 95139183 dated Nov. 5, 2012 along with English translation of relevant portions of action.
Office action and Search Report from Taiwanese Application No. 95139185 dated Oct. 24, 2012 along with English translation of relevant portions of action.
Office action from Chinese Application No. 200680041104.0 dated Jun. 13, 2012.
English Translation of JP Patent No. 2002-154843. Foreign patent along with English abstract previously submitted, May 28, 2002.
Office action from U.S. Appl. No. 11/699,719 dated Jul. 2, 2012.
Office action from Canadian Application No. 2,591,026 dated May 15, 2012 along with English translation of relevant portions of action.
Office action from Mexican Application No. 07/06989 dated Jun. 26, 2012.
Appeal Decision from U.S. Appl. No. 10/560,068 dated Aug. 15, 2012.
Office action from Canadian Application No. 2,626,733 dated Dec. 23, 2004.
Office action from European Application No. 09796243.5 dated Oct. 2, 2012.
Office action from U.S. Appl. No. 09/703,234 dated Apr. 15, 2002.
Office action from U.S. Appl. No. 09/703,234 dated Sep. 6, 2002.
Advisory action from U.S. Appl. No. 09/703,234 dated Nov. 19, 2002.
Office action from U.S. Appl. No. 09/703,234 dated Feb. 4, 2003.
Office action from U.S. Appl. No. 09/703,234 dated Jul. 11, 2003.
Advisory action from U.S. Appl. No. 09/703,234 dated Oct. 24, 2003.
Office action from U.S. Appl. No. 09/703,234 dated Dec. 16, 2003.
Notice of Allowance from U.S. Appl. No. 09/703,234 dated Jul. 6, 2004.
Office action from U.S. Appl. No. 10/560,068 dated Aug. 1, 2008.
Office action from U.S. Appl. No. 10/560,068 dated Dec. 15, 2008.
Advisory Action from U.S. Appl. No. 10/560,068 dated Feb. 25, 2009.
Office action from U.S. Appl. No. 10/560,068 dated May 7, 2009.
Office action from U.S. Appl. No. 10/560,068 dated Nov. 5, 2009.
Advisory Action from U.S. Appl. No. 10/560,068 dated Mar. 16, 2010.
Panel Decision of Pre-Appeal Brief from U.S. Appl. No. 10/560,068 dated Apr. 29, 2010.
Examiner's Answer from U.S. Appl. No. 10/560,068 dated Aug. 3, 2010.
Notice of Allowance from U.S. Appl. No. 11/267,702 dated Jul. 29, 2009.
Office action from U.S. Appl. No. 11/267,702 dated Dec. 3, 2009.
Notice of Allowance from U.S. Appl. No. 11/267,702 dated Jun. 16, 2010.
Notice of Allowance from U.S. Appl. No. 11/267,739 dated Jul. 13, 2009.
Office action from U.S. Appl. No. 11/267,739 dated Dec. 3, 2009.
Notice of Allowance from U.S. Appl. No. 11/267,739 dated Apr. 7, 2010.
Office action from U.S. Appl. No. 11/722,039 dated Oct. 28, 2009.
Office action from U.S. Appl. No. 11/722,039 dated Jun. 22, 2010.
Interview Summary from U.S. Appl. No. 11/722,039 dated Sep. 21, 2010.
Office action from Japanese Application No. 2008-540053 dated Jul. 30, 2012.
Office action from Japanese Application No. 2008-540052 dated Jul. 30, 2012.
Office action from Korean Application No. 10-2007-7016026 dated Aug. 9, 2012.
Office action from U.S. Appl. No. 12/643,411 dated Aug. 17, 2012.
Office action from U.S. Appl. No. 11/722,039 dated Aug. 24, 2012.
Lund, "Tensile strength of glass fibres", dated Feb. 18, 2010.
Office action from Chinese Application No. 200680041104.0 dated Sep. 13, 2012.
Notice of Allowance from U.S. Appl. No. 12/880,289 dated Aug. 31, 2012.
Notice of Allowance from U.S. Appl. No. 12/341,985 dated Oct. 11, 2012.
Office action from Japanese Application No. 2009-533917 dated Sep. 24, 2012.
Office action from U.S. Appl. No. 12/403,955 dated Apr. 24, 2012.
Office action from Taiwanese Application No. 094144552 dated May 7, 2012.
Notice of Allowance from U.S. Appl. No. 12/344,130 dated Jun. 7, 2012.
Notice of Allowance from U.S. Appl. No. 12/341,985 dated Jun. 11, 2012.
Office action from Russian Application No. 2008117092/03 dated Apr. 26, 2012.
Office action from Korean Application No. 2008-7010726 dated Nov. 14, 2012.
Office action from Korean Application No. 2008-7010727 dated Nov. 14, 2012.
Office action from U.S. Appl. No. 11/699,719 dated Jan. 22, 2013.
Office action from Chinese Application No. 200680041104.0 dated Jan. 14, 2013.
Office action from U.S. Appl. No. 12/643,411 dated Jan. 28, 2013.
Office action from Mexican Application No. 11/06712 dated Feb. 1, 2013 along with English translation of relevant portions of action.
Office action from U.S. Appl. No. 11/722,039 dated Oct. 19, 2010.
Office action from U.S. Appl. No. 11/722,039 dated Jun. 7, 2011.
Office action from U.S. Appl. No. 12/341,985 dated Nov. 17, 2010.
Office action from U.S. Appl. No. 12/341,985 dated Apr. 21, 2011.
Notice of Allowance from U.S. Appl. No. 12/341,985 dated Oct. 12, 2011.
Office action from U.S. Appl. No. 12/344,130 dated Nov. 17, 2010.
Office action from U.S. Appl. No. 12/344,130 dated Apr. 20, 2011.
Notice of Allowance from U.S. Appl. No. 12/344,130 dated Oct. 11, 2011.
Office action from U.S. Appl. No. 12/403,955 dated Dec. 9, 2011.
Office action from U.S. Appl. No. 12/880,289 dated Jul. 20, 2011.
Notice of Allowance from U.S. Appl. No. 12/880,289 dated Dec. 22, 2011.
International Search Report from PCT/FR04/01431 dated Jun. 11, 2003.
International Search Report from PCT/FR05/51090 date Mar. 23, 2006.

(56) References Cited

OTHER PUBLICATIONS

International Search Report and Written Opinion from PCT/US09/68949 dated May 7, 2010.
International Search Report and Written Opinion from PCT/US09/68955 dated May 7, 2010.
International Search Report and Written Opinion from PCT/US09/68965 dated May 7, 2010.
Office action from Australian Application No. 2006312015 dated May 5, 2011.
Office action from Australian Application No. 2006312106 dated May 5, 2011.
Office action from Chinese Application No. 200580043075.7 dated Dec. 7, 2011.
Office action from Chinese Application No. 200680041104.0 dated Aug. 4, 2010.
Office action from Chinese Application No. 200680041104.0 dated Mar. 22, 2011.
Office action from Chinese Application No. 200680041104.0 dated Jul. 14, 2011.
Office action from European Application No. 01987549.1 dated Aug. 5, 2011.
Office action from European Application No. 05825565.4 dated Dec. 14, 2007.
Office action from European Application No. 05825565.4 dated Nov. 19, 2010.
Office action from European Application No. 05825565.4 dated May 9, 2011.
Office action from European Application No. 05825565.4 dated Mar. 31, 2011.
Communication from EP application No. 06827125.3 dated Jun. 4, 2009 which includes the EP OA from Feb. 13, 2009 and the Search Report dated Dec. 10, 2008.
Office action from Indian Application No. 2108/KOLNP/2007 dated Jun. 28, 2011.
Office action from Japanese Application No. 2007-546144 dated Sep. 13, 2011.
Office action from Korean Application No. 2003-7005873 dated Jun. 26, 2007.
Office action from Korean Application No. 2003-7005873 dated Nov. 29, 2007.
Office action from Mexican Application No. 07/006989 dated Oct. 24, 2011.
Communication regarding Mexican Application No. 08/05816 dated Mar. 15, 2011.
Office action from Mexican Application No. 08/005819 dated Mar. 16, 2011.
Office action from Mexican Application No. 08/005819 dated Jun. 3, 2011.
Office action from Russian Application No. 2008117091 dated Apr. 19, 2010.
Office action from Russian Application No. 2008117091 dated Dec. 13, 2010.
Office action from Russian Application No. 2008117092 dated Oct. 12, 2011.
Aslanova, "Steklyannye volokna", Glass Fibers, Moscow, Khimiya, 1979, I, 256 pp. pp. 33, 34, Fig. 3.2).
Chernyak et alo. "Nepreryvnoe steklyannoe volokno" Continuous Glass Fiber, Moscow, Khimiya, 1965.
Fredell, "Fiber metal laminates for improved structural integrity", 1992, conference paper.
Joosee, "Literature search of mechanical properties of fiber-reinforced plastics for wind turbine rotors", Dec. 1988 English abstract included.
Popov, et al., "Proizvodstvo i primenenie plavlenolitykh ogneuporov", Manufacture and Applicaton of Molen Cast Refractory Materials, Moscow, Metallurgiya, 1985, IV, p. 212-213.
Office action from U.S. Appl. No. 11/722,039 dated Mar. 1, 2010.
Office action from Brazilian Application No. PI01149733 dated Mar. 10, 2009.
Office action from Canadian Application No. 2,528,923 dated Dec. 9, 2010 along with English translation of relevant portions of action.
Office action from Canadian Application No. 2,528,923 dated Jul. 12, 2011.
Office action from Chinese Application No. 200480015986.4 dated Jul. 6, 2007.
Office action from Chinese Application No. 200580043075.7 dated Feb. 5, 2010.
Office action from Chinese Application No. 200680041114.4 dated Feb. 29, 2012.
Office action from European Application No. 04767297.7 dated Sep. 8, 2006.
Search Report from French Registration No. 635569 (FR 0306981) dated Feb. 13, 2004.
Search Report from French Registration No. 658923 (FR 0413443) dated Aug. 16, 2005.
Office action from Indian Application No. 00501/KOLNP/2003 dated Jul. 7, 2006.
Office action from Indian Application No. 00501/KOLNP/2003 dated May 14, 2007.
Office action from Indian Application No. 2546/KOLNP/2005 dated Jun. 15, 2007.
Office action from Japanese Application No. 2002-544374 dated Sep. 28, 2007.
Office action from Japanese Application No. 2002-544374 dated Jul. 27, 2009.
Office action from Japanese Application No. 2002-544374 dated Jul. 12, 2010.
Office action from Japanese Application No. 2006-516274 dated Jun. 22, 2010.
Office action from Japanese Application No. 2006-516274 dated Feb. 22, 2011.
Office action from Korean Application No. 10-2005-7023679 dated Mar. 3, 2011.
Office action from Mexican Application No. PA/a/2002/000814 dated Feb. 22, 2006.
Office action from Mexican Application No. PA/a/2002/00814 dated Sep. 9, 2005.
Office action from Mexican Application No. PA/a/2002/00814 dated Jun. 23, 2005.
Office action from Mexican Application No. PA/a/2002/00814 dated Sep. 26, 2002.
Office action from Mexican Application No. 05/013323 dated Feb. 27, 2006.
Office action from Mexican Application No. 05/013323 dated May 29, 2009.
Office action from Mexican Application No. 07/06989 dated Aug. 22, 2007.
Office action from Russian Application No. 2007126843 dated Sep. 24, 2009.
Office action from Russian Application No. 2007126843 dated Dec. 11, 2009.
Office action from Canadian Application No. 2,426,637 dated Aug. 28, 2008.
Office action from Russian Application No. 2006100296/03 dated Jun. 6, 2008.
Office action from Russian Application No. 2006100296/03 dated Nov. 26, 2008.
Office action from Chinese Application No. 200680041114.4 dated Mar. 25, 2011.
Office action from Korean Application No. 10-2007-7018026 dated Feb. 25, 2013.
Office action from Brazilian Application No. PI0411336-5 dated Apr. 5, 2013.
Office action from Canadian Application No. 2,591,026 dated Mar. 25, 2013.
Office action from Chinese Application No. 200980156454.5 dated Apr. 11, 2013.
Office action from Chinese Application No. 200980156910.6 dated Apr. 16, 2013.
Refusal Decision from Russian Application No. 2008117092/03 dated Mar. 15, 2013.

(56) References Cited

OTHER PUBLICATIONS

Notice of Allowance from U.S. Appl. No. 11/699,719 dated May 7, 2013.
Office action from U.S. Appl. No. 12/989,225 dated Nov. 19, 2013.
Notice of Allowance from U.S. Appl. No. 12/989,225 dated Mar. 11, 2013.
Office action from Saudi Arabian Application No. 109300629 dated Jun. 5, 2013 along with English translation of relevant portions of action.
Office action from Indian Application No. 1732/KOLNP/2008 dated Mar. 15, 2013 received on May 25, 2013.
Office action from Chinese Application No. 200580043075.7 dated May 2, 2013.
Examiner's Answer from U.S. Appl. No. 11/722,039 dated Jul. 26, 2013.
Office action from Chinese Application No. 200680041114.4 dated Jul. 1, 2013.
Office action from Mexican Application No. 07/006989 dated Jun. 19, 2013.
Notice of Allowance from U.S. Appl. No. 11/699,719 dated Jul. 11, 2013.
Office action from Canadian Application No. 2,626,732 dated Jun. 13, 2013.
Office action from Canadian Application No. 2,626,733 dated Jun. 27, 2013.

* cited by examiner

COMPOSITION FOR HIGH PERFORMANCE GLASS HIGH PERFORMANCE GLASS FIBERS AND ARTICLES THEREFROM

CROSS REFERENCE TO RELATED APPLICATIONS

This application is a continuation of U.S. patent application Ser. No. 11/267,739 filed Nov. 4, 2005, the entire content of which is expressly incorporated herein by reference in its entirety.

TECHNICAL FIELD AND INDUSTRIAL APPLICABILITY OF THE INVENTION

The present invention is generally directed to a composition for continuous glass fibers for use in high-strength applications as well as high-strength glass fibers and articles.

BACKGROUND OF THE INVENTION

The most common glass composition for making continuous glass fiber strands is "E-Glass." The liquidus temperature of E-Glass is approximately 2100° F. (1149° C.) or lower. One advantage of E-Glass is that its liquidus temperature allows operating temperatures for producing glass fibers to be approximately 1900° F. to 2400° F. (1038° C. to 1316° C.). The ASTM classification for E-glass fiber yarns used in printed circuit boards and aerospace applications defines the composition to be 52 to 56 weight % $SiO_2$, 16 to 25 weight % CaO, 12 to 16 weight % $Al_2O_3$, 5 to 10 weight % $B_2O_3$, 0 to 5 weight % MgO, 0 to 2 weight % $Na_2O$ and $K_2O$, 0 to 0.8 weight % $TiO_2$, 0.05 to 0.4 weight % $Fe_2O_3$ and 0 to 1.0 weight % Fluorine.

Boron-free fibers are sold under the trademark ADVANTEX (Owens Corning, Toledo, Ohio, USA). Boron-Free fibers, such as are disclosed in U.S. Pat. No. 5,789,329, incorporated herein by reference in its entirety, offer a significant improvement in operating temperatures over boron-containing E-glass. Boron-Free glass fibers fall under the ASTM definition for E-glass fibers for use in general-use applications.

S-Glass is a family of glasses composed primarily of the oxides of magnesium, aluminum, and silicon with a chemical composition that produces glass fibers having a higher mechanical strength than E-Glass fibers. The composition for forming S-Glass includes approximately 65 weight % $SiO_2$, 25 weight % $Al_2O_3$, and 10 weight % MgO. S-glass has a composition that was originally designed to be used in high-strength applications such as ballistic armor.

R-Glass is a family of glasses that are composed primarily of the oxides of silicon, aluminum, magnesium, and calcium with a chemical composition that produces glass fibers with a higher mechanical strength than E-Glass fibers. R-Glass has a composition that contains about 58 to about 60 weight % $SiO_2$, about 23.5 to about 25.5 weight % $Al_2O_3$, about 14 to about 17 weight % CaO plus MgO, 0% $B_2O_3$, 0% $F_2$ and less than about 2 weight % of miscellaneous components. R-Glass contains more alumina and silica than E-Glass and requires higher melting and processing temperatures during fiber forming. Typically, the melting and processing temperatures for R-Glass are at least about 160° C. higher than those for E-Glass. This increase in processing temperature requires the use of a high-cost platinum-lined melter. In addition, the close proximity of the liquidus temperature to the forming temperature in R-Glass requires that the glass be fiberized at a viscosity lower than E-Glass, which is customarily fiberized at or near about 1000 poise. Fiberizing R-Glass at the customary 1000 poise viscosity would likely result in glass devitrification, which causes process interruptions and reduced productivity.

Tables IA-IE set forth the compositions for a number of conventional high-strength glass compositions.

TABLE I-A

| Constituent | Chinese High Strength glass | RUSSIAN CONTINUOUS ROVING MAGNESIUM ALUMINO-SILICATE | NITTOBO "T" Glass Fabric "B" | NITTOBO "T" Glass Fabric (Yarn) "C" |
|---|---|---|---|---|
| $SiO_2$ | 55.08 | 55.81 | 64.58 | 64.64 |
| CaO | 0.33 | 0.38 | 0.44 | 0.40 |
| $Al_2O_3$ | 25.22 | 23.78 | 24.44 | 24.57 |
| $B_2O_3$ | 1.85 | | 0.03 | 0.03 |
| MgO | 15.96 | 15.08 | 9.95 | 9.92 |
| $Na_2O$ | 0.12 | 0.063 | 0.08 | 0.09 |
| Fluorine | 0.03 | | 0.034 | 0.037 |
| $TiO_2$ | 0.023 | 2.33 | 0.019 | 0.018 |
| $Fe_2O_3$ | 1.1 | 0.388 | 0.187 | 0.180 |
| $K_2O$ | 0.039 | 0.56 | 0.007 | 0.010 |
| $ZrO_2$ | 0.007 | 0.15 | | |
| $Cr_2O_3$ | | 0.011 | 0.003 | 0.003 |
| $Li_2O$ | | 1.63 | | |
| $CeO_2$ | | | | |

TABLE I-B

| Constituent | Nitto Boseki A&P Yarn | Nitto Boseki NT6030 Yarn | Nitto Boseki TE Glass RST-220PA-535CS | Vetrotex Saint Gobain SR Glass Stratifils SR CG 250 P109 | Polotsk STEKLOVOLOKNO High Strength Glass |
|---|---|---|---|---|---|
| $SiO_2$ | 65.51 | 64.60 | 64.20 | 63.90 | 58.64 |
| CaO | 0.44 | 0.58 | 0.63 | 0.26 | 0.61 |
| $Al_2O_3$ | 24.06 | 24.60 | 25.10 | 24.40 | 25.41 |
| $B_2O_3$ | | | | | 0.04 |
| MgO | 9.73 | 9.90 | 9.90 | 10.00 | 14.18 |
| $Na_2O$ | 0.04 | 0.06 | 0.020 | 0.039 | 0.05 |
| Fluorine | 0.07 | | | | 0.02 |
| $TiO_2$ | 0.016 | 0.000 | 0.000 | 0.210 | 0.624 |
| $Fe_2O_3$ | 0.067 | 0.079 | 0.083 | 0.520 | 0.253 |
| $K_2O$ | 0.020 | 0.020 | 0.020 | 0.540 | 0.35 |
| $ZrO_2$ | 0.079 | | | | |
| $Cr_2O_3$ | 0.0010 | | | 0.001 | 0.023 |
| $Li_2O$ | | | | | |
| $CeO_2$ | | | | | |

TABLE I-C

| Constituent | Chinese High Strength Yarn (8 micron) | Chinese High Strength Glass Roving | Zentron S-2 Glass Roving | SOLAIS Glass Sample | Advanced Glass Yarns R Glass |
|---|---|---|---|---|---|
| $SiO_2$ | 55.22 | 55.49 | 64.74 | 64.81 | 58.46 |
| CaO | 0.73 | 0.29 | 0.14 | 0.55 | 9.39 |
| $Al_2O_3$ | 24.42 | 24.88 | 24.70 | 24.51 | 24.55 |
| $B_2O_3$ | 3.46 | 3.52 | | 0.02 | 0.04 |
| MgO | 12.46 | 12.28 | 10.24 | 9.35 | 5.91 |
| $Na_2O$ | 0.104 | 0.06 | 0.17 | 0.16 | 0.079 |
| Fluorine | 0.07 | | | 0.02 | 0.054 |
| $TiO_2$ | 0.32 | 0.36 | 0.015 | 0.04 | 0.196 |
| $Fe_2O_3$ | 0.980 | 0.930 | 0.045 | 0.238 | 0.400 |
| $K_2O$ | 0.240 | 0.150 | 0.005 | 0.03 | 0.67 |
| $ZrO_2$ | | | | | |
| $Cr_2O_3$ | 0.0050 | | | 0.007 | 0.005 |
| $Li_2O$ | 0.59 | 0.63 | | | |
| $CeO_2$ | 1.23 | 1.25 | | | |

TABLE I-D

| Constituent | Advanced Glass Yarns S Glass | Culimeta Roving | IVG Vertex B96 675 Yarn | IVG Vertex Glass Roving | IVG Vertex Outside #1 Glass Roving |
|---|---|---|---|---|---|
| $SiO_2$ | 64.61 | 59.37 | 58.34 | 58.58 | 58.12 |
| CaO | 0.17 | 0.27 | 0.31 | 0.30 | 0.31 |
| $Al_2O_3$ | 24.84 | 25.49 | 23.81 | 24.26 | 24.09 |
| $B_2O_3$ | 0.04 | 0.05 | | | |
| MgO | 10.11 | 13.47 | 14.99 | 15.02 | 15.36 |
| $Na_2O$ | 0.118 | 0.024 | 0.05 | 0.02 | 0.03 |
| Fluorine | 0.03 | | 0.04 | 0.04 | 0.04 |
| $TiO_2$ | 0.011 | 0.530 | 1.380 | 0.67 | 0.91 |
| $Fe_2O_3$ | 0.042 | 0.374 | 0.333 | 0.336 | 0.303 |
| $K_2O$ | | 0.48 | 0.42 | 0.28 | 0.29 |
| $ZrO_2$ | | 0.152 | 0.129 | 0.165 | 0.157 |
| $Cr_2O_3$ | 0.0050 | 0.0120 | 0.0100 | 0.0120 | 0.0120 |
| $Li_2O$ | | | | | |
| $CeO_2$ | | | | | |

TABLE I-E

| Constituent | IVG Vertex Outside #2 Glass Roving | RH CG250 P109 Glass Fiber Strand |
|---|---|---|
| $SiO_2$ | 58.69 | 58.54 |
| CaO | 0.29 | 9.35 |
| $Al_2O_3$ | 24.3 | 25.39 |
| $B_2O_3$ | | |
| MgO | 15.06 | 6.15 |
| $Na_2O$ | 0.03 | 0.10 |
| Fluorine | 0.04 | 0.16 |
| $TiO_2$ | 0.64 | 0.008 |
| $Fe_2O_3$ | 0.331 | 0.069 |
| $K_2O$ | 0.36 | 0.14 |
| $ZrO_2$ | 0.187 | 0.006 |
| $Cr_2O_3$ | 0.0130 | |
| $Li_2O$ | | |
| $CeO_2$ | | |

R-Glass and S-Glass are produced by melting the constituents of the compositions in a platinum-lined melting container. The costs of forming R-Glass and S-Glass fibers are dramatically higher than E-Glass fibers due to the cost of producing the fibers in such melters. Thus, there is a need in the art for glass compositions useful in the formation of high performance glass fibers from a direct-melt process in a refractory-lined furnace and fibers formed from such compositions.

SUMMARY OF THE INVENTION

The invention, in part, is a glass composition for the formation of continuous glass fibers that are suitable for use in high-strength applications. The composition of the present invention may be inexpensively formed into glass fibers using low-cost, direct melting in refractory-lined furnaces due to the relatively low fiberizing temperature of the glass fibers. Once formed into fibers, the glass composition provides the strength characteristics of higher-priced glass fibers such as S-Glass. The composition of the present invention includes about 60.5 to about 70.5 weight % $SiO_2$, about 10.0 to about 24.5 weight % $Al_2O_3$, about 6.0 to about 20.0 weight % RO, where RO equals the sum of MgO, CaO, SrO and BaO, and about 0.0 to about 3.0 weight % alkali metal oxides. In a preferred embodiment, the glass composition is composed of about 61 to about 68 weight % $SiO_2$, about 15 to about 19 weight % $Al_2O_3$, about 15 to about 20 weight % RO, where RO equals the sum of MgO, CaO, SrO and BaO, and about 0 to about 3 weight % alkali metal oxides. The composition preferably does not contain more than about 4 weight % of oxides or halogens selected from the group consisting of ZnO, $SO_3$, Fluorine, $B_2O_3$, $TiO_2$, $ZrO_2$ and $Fe_2O_3$. The desired properties of the glass composition of the present invention include a fiberizing temperature of less than about 2650° F. and a liquidus temperature that is preferably below the fiberizing temperature by at least about 80° F., more preferably by at least about 120° F., and most preferably by at least about 150° F.

DETAILED DESCRIPTION AND PREFERRED EMBODIMENTS OF THE INVENTION

Fiberizing properties of the glass composition of the present invention include the fiberizing temperature, the liquidus, and delta-T. The fiberizing temperature is defined as the temperature that corresponds to a viscosity of about 1000 Poise. As discussed in more detail below, a lowered fiberizing temperature reduces the production cost of the fibers, allows for a longer bushing life, increases throughput, permits the glass to be melted in a refractory-lined melter, and reduces energy usage. For example, at a lower fiberizing temperature, a bushing operates at a cooler temperature and does not "sag" as quickly. Sag is a phenomenon that occurs in bushings that are held at an elevated temperature for extended periods of time. By lowering the fiberizing temperature, the sag rate of the bushing may be reduced and the bushing life can be increased. In addition, a lower fiberizing temperature allows for a higher throughput since more glass can be melted in a given period at a given energy input. As a result, production cost is reduced. In addition, a lower fiberizing temperature will also permit glass formed with the inventive composition to be melted in a refractory-lined melter since both its melting and fiberizing temperatures are below the upper use temperatures of many commercially available refractories.

The liquidus is defined as the highest temperature at which equilibrium exists between liquid glass and its primary crystalline phase. At all temperatures above the liquidus, the glass is free from crystals in its primary phase. At temperatures below the liquidus, crystals may form.

Another fiberizing property is delta-T (ΔT), which is defined as the difference between the fiberizing temperature and the liquidus. A larger ΔT offers a greater degree of flexibility during the formation of the glass fibers and helps to inhibit devitrification of the glass (that is, the formation of crystals within the melt) during melting and fiberizing. Increasing the ΔT also reduces the production cost of the glass fibers by allowing for a greater bushing life and by providing a wider process window for forming fibers.

The glasses of the present invention are suitable for melting in traditional commercially available refractory-lined glass melters, which are widely used in the manufacture of glass reinforcement fibers. Starting batch components typically include $SiO_2$ (ground silica sand), and $Al_2O_3$ (calcined alumina), as well as chain modifiers from source materials such as $MgCO_3$ (magnesite), $CaCO_3$ (limestone), $SrCO_3$ (strontianite), $BaCO_3$ (witherite), $ZrSiO_4$ (zircon), and $Na_2CO_3$ (natrite).

The glass batch is preferably composed of about 60.5 to about 70.5 weight percent $SiO_2$, about 10.0 to about 24.5 weight percent $Al_2O_3$, about 6.0 to about 20.0 weight percent RO, where RO equals the sum of MgO, CaO, and SrO, and about 0.0 to about 3.0 weight percent alkali metal oxides. A fiber formed in accordance with the present invention will typically include small amounts of ZnO, $SO_3$, Fluorine, $B_2O_3$, $TiO_2$ and $Fe_2O_3$, preferably in an amount of less than 4 weight percent. In addition, a fiber formed in accordance with the present invention will preferably having a fiberizing temperature of less than about 2650° F., a ΔT of at least about 80° F., preferably a ΔT of at least about 120° F., and most preferably a ΔT of at least 150° F., and a coefficient of thermal expansion (CTE) of about $2.28 \times 10^{-6}$ in/in/° F. to about $2.77 \times 10^{-6}$ in/in/° F. Further, the glass of the present invention preferably have a strength in excess of 600 KPSI, preferably a strength in excess of about 630 KPSI, and most preferably a strength in excess of about 695 KPSI. Further, the glass fibers will desirably have a modulus greater than about 12.0 MPSI, preferably greater then about 12.18 MPSI, and most preferably greater then about 12.6 MPSI. It will be appreciated that certain details of construction are not provided in view of such details being conventional and well within the skill of the art.

The present invention also includes a composite material including glass fibers, as described above, in combination with a hardenable matrix material. The composite material is especially useful in applications where high strength and stiffness and low weight are desired. Such applications include aircraft, automotive, and wind energy (such as windmill blades) as well as any other application where low weight, stiffness and high strength are desired. Suitable hardenable matrix materials include thermoset and thermoplastic resins. By way of example, suitable thermoset matrix materials include vinyl esters, polyesters, resin epoxies and combinations or copolymers thereof. Typically, windmill blades are formed by any suitable composite fabrication technique, such as vacuum-assisted resin infusion or pre-impregnated reinforcement lay-up.

Having generally described this invention, a further understanding can be obtained by reference to certain specific examples illustrated below which are provided for purposes of illustration only and are not intended to be all inclusive or limiting unless otherwise specified.

EXAMPLES

The glasses in the examples listed in Tables IIA-IIC were melted in platinum crucibles or in a continuous platinum-lined melter for determining the mechanical and physical properties of the glass and fibers produced therefrom. The units of measurement for the physical properties are: Viscosity (° F.), Liquidus temperature (° F.) and ΔT (° F.). In some examples the glasses were fiberized and Strength (KPsi), Density (g/cc), Modulus (MPsi), Softening Point (° F.) and coefficient of thermal expansion (CTE) (in/in/(° F.)) were measured.

The fiberizing temperature was measured using a rotating spindle viscometer. The fiberizing viscosity is defined as 1000 Poise. The liquidus was measured by placing a platinum container filled with glass in a thermal gradient furnace for 16 hours. The greatest temperature at which crystals were present was considered the liquidus temperature. The modulus was measured using the sonic technique on a single fiber of glass. The tensile strength was measured on a pristine single fiber. The CTE was measured with a dilatometer over the range of temperature from 25 to 600 degrees C. The softening point temperature was measured using the ASTM C338 fiber-elongation method.

TABLE IIA

| Glass | Ex. 1 | Ex. 2 | Ex. 3 | Ex. 4 | Ex. 5 | Ex. 6 |
| --- | --- | --- | --- | --- | --- | --- |
| $SiO_2$ | 62.63 | 62.42 | 61.75 | 63.01 | 63.07 | 63.16 |
| CaO | 8.49 | 8.64 | 8.57 | 4.84 | 4.85 | 4.8 |
| $Al_2O_3$ | 18.50 | 18.54 | 18.82 | 19.99 | 20.03 | 19.76 |
| MgO | 9.47 | 9.64 | 9.65 | 11.26 | 11.28 | 11.33 |
| $Na_2O$ | 0.70 | 0.69 | | 0.70 | 0.70 | |
| $TiO_2$ | 0.00 | 0.01 | 0.01 | 0.00 | 0.01 | 0.02 |
| $Fe_2O_3$ | 0.20 | 0.05 | 0.045 | 0.20 | 0.05 | 0.037 |
| Measured Viscosity (° F.) | 2491 | na | na | 2514 | na | na |
| Measured Liquidus (° F.) | 2261 | 2247 | na | 2335 | na | na |
| Measured DT (° F.) | 230 | na | na | 179 | na | na |
| Measured Strength (KPsi) | 672 | na | na | 695 | na | na |
| Measured Density (g/cc) | 2.556 | na | na | 2.530 | na | na |
| Measured Modulus (MPsi) | 12.4 | 12.6 | na | 12.6 | 12.7 | na |
| Softening Point (° F.) | na | na | na | 1765 | na | na |
| CTE in/in/(° F.) | na | na | na | $2.28 \times 10^{-6}$ | na | na |

TABLE II-B

| Glass | Ex. 7 | Ex. 8 | Ex. 9 | Ex. 10 | Ex. 11 | Ex. 12 |
|---|---|---|---|---|---|---|
| $SiO_2$ | 62.32 | 63.89 | 63.14 | 61.39 | 61.39 | 65.00 |
| CaO | 11.56 | 11.21 | 11.96 | 11.96 | 8.71 | 13.00 |
| $Al_2O_3$ | 17.25 | 16.39 | 16.39 | 18.14 | 18.89 | 15.00 |
| MgO | 7.98 | 6.62 | 6.62 | 6.62 | 9.62 | 5.00 |
| $Na_2O$ | 0.70 | 0.75 | 0.75 | 0.75 | 0.25 | 1.00 |
| $TiO_2$ | 0.00 | 0.75 | 0.75 | 0.75 | 0.75 | 1.00 |
| $Fe_2O_3$ | 0.20 | 0.39 | 0.39 | 0.39 | 0.39 | |
| Measured Viscosity (° F.) | 2458 | 2493 | 2435 | 2431 | 2434 | 2509 |
| Measured Liquidus (° F.) | 2301 | 2268 | 2294 | 2353 | 2261 | 2226 |
| Measured DT (° F.) | 157 | 225 | 141 | 78 | 173 | 283 |
| Measured Strength (KPsi) | 632 | 636 | 622 | 615 | 682 | 612 |
| Measured Density (g/cc) | 2.573 | 2.553 | 2.567 | 2.567 | 2.564 | na |
| Measured Modulus (MPsi) | 12.2 | 12.2 | 12.2 | 12.2 | 12.6 | na |
| Softening Point (° F.) | 1729 | na | na | na | na | na |
| CTE in/in/(° F.) | $2.77 \times 10^{-6}$ | na | na | na | na | na |

TABLE II-C

| Glass | Ex. 13 | Ex. 14 | Ex. 15 | Ex. 16 | Ex. 17 | Ex. 18 |
|---|---|---|---|---|---|---|
| $SiO_2$ | 63.89 | 65.00 | 64.00 | 63.89 | 65.00 | 65.00 |
| CaO | 6.96 | 14.00 | 4.00 | 8.96 | 14.00 | 12.50 |
| $Al_2O_3$ | 18.64 | 15.00 | 20.00 | 18.89 | 15.00 | 15.00 |
| MgO | 9.62 | 6.00 | 11.00 | 6.62 | 5.00 | 5.00 |
| $Na_2O$ | 0.25 | 0.00 | 1.00 | 0.75 | 0.00 | 1.00 |
| $TiO_2$ | 0.25 | 0.00 | 0.00 | 0.75 | 1.00 | 1.00 |
| $Fe_2O_3$ | 0.39 | 0.00 | 0.00 | 0.14 | 0.00 | 0.50 |
| Measured Viscosity (° F.) | 2513 | 2508 | 2548 | 2565 | 2481 | 2523 |
| Measured Liquidus (° F.) | 2337 | 2373 | 2401 | 2288 | 2403 | 2227 |
| Measured DT (° F.) | 176 | 135 | 147 | 277 | 78 | 296 |
| Measured Strength (KPsi) | 695 | 624 | na | na | 604 | na |
| Measured Density (g/cc) | 2.480 | 2.554 | na | na | 2.546 | na |
| Measured Modulus (MPsi) | 12.3 | 12.0 | na | na | 11.9 | na |
| Softening Point (° F.) | na | na | na | na | na | na |
| CTE in/in/(° F.) | na | na | na | na | na | na |

As is understood in the art, the above exemplary inventive compositions do not always total 100% of the listed components due to statistical conventions (such as, rounding and averaging) and the fact that some compositions may include impurities that are not listed. Of course, the actual amounts of all components, including any impurities, in a composition always total 100%. Furthermore, it should be understood that where small quantities of components are specified in the compositions, for example, quantities on the order of about 0.05 weight percent or less, those components may be present in the form of trace impurities present in the raw materials, rather than intentionally added.

Additionally, components may be added to the batch composition, for example, to facilitate processing, that are later eliminated, thereby forming a glass composition that is essentially free of such components. Thus, for instance, minute quantities of components such as fluorine and sulfate may be present as trace impurities in the raw materials providing the silica, calcia, alumina, and magnesia components in commercial practice of the invention or they may be processing aids that are essentially removed during manufacture.

As is apparent from the above examples, glass fiber compositions of the invention have advantageous properties, such as low fiberizing temperatures and wide differences between the liquidus temperatures and the fiberizing temperatures (high ΔT values). Other advantages and obvious modifications of the invention will be apparent to the artisan from the above description and further through practice of the invention). The high-performance glass of the present invention melts and refines at relatively low temperatures, has a workable viscosity over a wide range of relatively low temperatures, and a low liquidus temperature range.

The invention of this application has been described above both generically and with regard to specific embodiments. Although the invention has been set forth in what is believed to be the preferred embodiments, a wide variety of alternatives known to those of skill in the art can be selected within the generic disclosure. Other advantages and obvious modifications of the invention will be apparent to the artisan from the above description and further through practice of the invention. The invention is not otherwise limited, except for the recitation of the claims set forth below.

We claim:

1. A glass fiber formed from a batch composition, said batch composition comprising:
   about 60.5 to about 70.5 weight percent $SiO_2$;
   about 10 to about 24.5 weight percent $Al_2O_3$;
   about 11.96 to about 20 weight percent alkaline earth oxide, said alkaline earth oxide being the sum of MgO, CaO, SrO and BaO, wherein the amount of MgO in said alkaline earth oxide comprises at least 5 weight percent of said batch composition and the amount of CaO in said alkaline earth oxide comprises at least 6.96 weight percent of said batch composition; and 0 to about 3 weight percent alkali metal oxides, wherein said glass fiber has a ΔT of at least 135° F.

2. The glass fiber of claim 1, further comprising less than 4 weight percent of compounds selected from the group consisting of ZnO, $SO_3$, Fluorine, $B_2O_3$, $TiO_2$ and $Fe_2O_3$.

3. The glass fiber of claim 1, wherein said glass has a fiberizing temperature less than about 2650° F.

4. The glass fiber of claim 3 wherein the ΔT for the glass is at least about 150° F.

5. The glass fiber of claim 1, wherein said fiber has a coefficient of thermal expansion (CTE) between about 2.28×$10^{-6}$ in/in/° F. and about 2.77×$10^{-6}$ in/in/° F.

6. The glass fiber of claim 1, wherein said fiber has a strength in excess of about 600 KPSI.

7. The glass fiber of claim 1, wherein said fiber has a strength in excess of about 630 KPSI.

8. The glass fiber of claim 1, wherein said fiber has a strength in excess of about 695 KPSI.

9. The glass fiber of claim 1, wherein said fiber has a modulus in excess of about 12.0 MPSI.

10. The glass fiber of claim 1, wherein said fiber has a modulus in excess of about 12.2 MPSI.

11. The glass fiber of claim 1, wherein said fiber has a modulus in excess of about 12.6 MPSI.

12. The glass fiber of claim 1, further including less than 1 weight percent $TiO_2$.

13. A fiberglass reinforced article comprising:
glass fibers comprising:
    about 60.5 to about 70.5 weight percent $SiO_2$;
    about 10 to about 24.5 weight percent $Al_2O_3$;
    about 6.0 to about 20.0 weight percent alkaline earth oxide, said alkaline earth oxide being the sum of MgO, CaO, SrO and BaO, wherein the amount of MgO in said alkaline earth oxide comprises at least 5 weight percent of said batch composition;
    less than about 1% $TiO_2$;
    up to 3 weight percent alkali metal oxides; and
    a curable matrix material,
wherein said glass fibers have a ΔT of at least 135° F.

14. The fiberglass reinforced article of claim 13, wherein said reinforced article is a blade for a wind turbine.

15. The fiberglass reinforced article of claim 13, wherein said curable matrix material is selected from the group consisting of vinyl ester, polyester, resin epoxy and combinations or copolymers thereof.

16. The fiberglass reinforced article of claim 13, wherein said glass fibers further comprise less than 4 weight percent of compounds selected from the group consisting of ZnO, $SO_3$, Fluorine, $B_2O_3$, and $Fe_2O_3$.

17. The fiberglass reinforced article of claim 13, wherein at least 6.96 weight percent of said alkaline earth oxide comprises CaO.

18. A glass fiber formed from a batch composition, said batch composition comprising:
    about 60.5 to about 70.5 weight percent $SiO_2$;
    about 10 to about 24.5 weight percent $Al_2O_3$;
    about 6 to about 20 weight percent alkaline earth oxide, wherein said alkaline earth oxide includes CaO and the amount of MgO in said alkaline earth oxide comprises at least 5 weight percent of said batch composition;
    less than about 1% $TiO_2$;
    less than 4 weight percent of compounds selected from the group consisting of ZnO, $SO_3$, Fluorine, $B_2O_3$, and $Fe_2O_3$; and
    0 to about 3 weight percent alkali metal oxide,
wherein said glass fiber has a ΔT of at least 135° F.

19. The glass fiber of claim 18, wherein said glass has a fiberizing temperature less than about 2650° F.

20. The glass fiber of claim 18, wherein at least 6.96 weight percent of said alkaline earth oxides comprise CaO.

21. A fiberglass reinforced article comprising:
glass fibers comprising:
    about 60.5 to about 70.5 weight percent $SiO_2$;
    about 10 to about 24.5 weight percent $Al_2O_3$;
    about 11.96 to about 20.0 weight percent alkaline earth oxide, wherein the amount of MgO in said alkaline earth oxide comprises at least 5 weight percent of said batch composition and the amount of CaO in said alkaline earth oxide comprises at least 6.96 weight percent of said batch composition;
    0 to about 3 weight percent alkali metal oxides; and
    less than 4 weight percent of compounds selected from the group consisting of ZnO, $SO_3$, Fluorine, $B_2O_3$, $TiO_2$ and $Fe_2O_3$; and
    a curable matrix material,
wherein said glass fibers have a ΔT of at least 135° F.

22. The fiberglass reinforced article of claim 21, wherein said glass fiber has a fiberizing temperature less than about 2650° F.

23. The fiberglass reinforced article of claim 21, further including less than about 1 weight percent $TiO_2$.

* * * * *